United States Patent
Teed

[11] 3,805,833
[45] Apr. 23, 1974

[54] BACK-SUCTION DIVERTER VALVE

[76] Inventor: Gary W. Teed, 328 Plumtree Dr., Arvin, Calif. 93203

[22] Filed: Jan. 12, 1973

[21] Appl. No.: 323,281

Related U.S. Application Data

[63] Continuation-in-part of Ser. No. 191,033, Oct. 20, 1971, abandoned.

[52] U.S. Cl. ............................................. 137/610
[51] Int. Cl. ........................................... F16k 11/14
[58] Field of Search ...... 137/608, 609, 610, 625.48, 137/625.47, 611, 612

[56] References Cited
UNITED STATES PATENTS

| | | | |
|---|---|---|---|
| 39,812 | 9/1863 | Hayman | 137/625.48 X |
| 630,384 | 8/1899 | Mann | 137/625.48 X |
| 1,568,976 | 1/1926 | Jones et al. | 137/625.48 |
| 2,252,141 | 8/1941 | Seidel et al. | 137/625.48 |
| 2,557,460 | 6/1951 | Ott | 137/625.48 |
| 2,858,851 | 11/1958 | Holl | 137/625.48 X |
| 2,998,828 | 9/1961 | Hare | 137/625.48 X |
| 3,089,515 | 5/1963 | Bochan | 137/610 |
| 3,132,669 | 5/1964 | Feldsted | 137/610 X |
| 3,545,470 | 12/1970 | Paton | 137/610 X |

*Primary Examiner*—Samuel Scott
*Attorney, Agent, or Firm*—Lyon & Lyon

[57] ABSTRACT

A diverter valve having an inlet port and two outlet ports, with a valve element slidably mounted within the valve housing. In one position the valve element is operative to communicate the inlet port with a first outlet port. In the second position, the valve element diverts flow from the inlet port to the second outlet or bypass port and also couples a back-suction passage between the first outlet port and the bypass port. The configuration of the valve element includes a venturi-like restriction operative when the element is in the second position to provide negative pressure in the back-suction passage to rapidly shut off residual flow at the first outlet port.

13 Claims, 12 Drawing Figures

INVENTOR.
GARY W. TEED

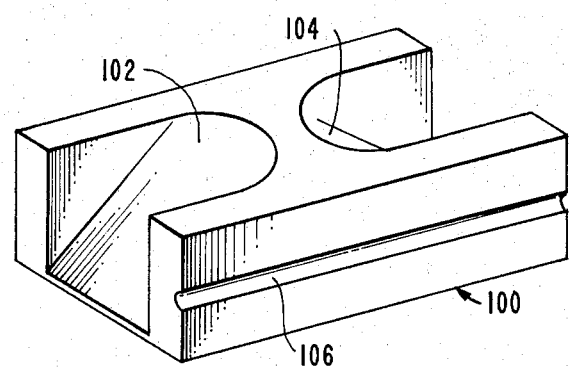
FIG.—7
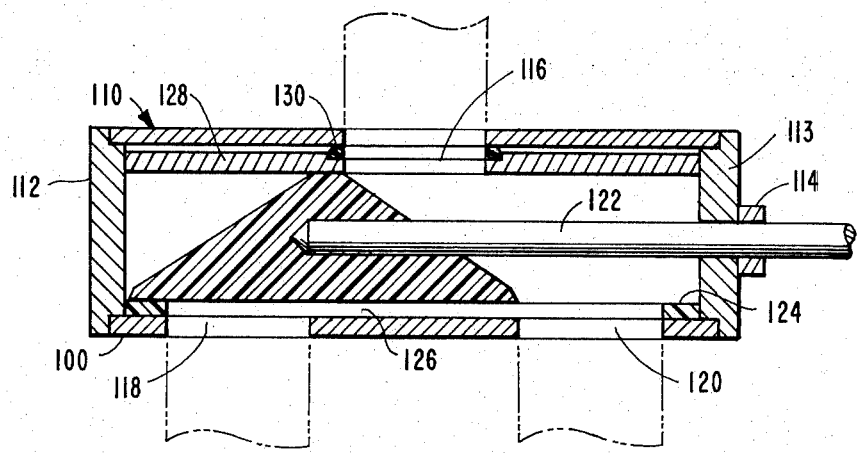
FIG.—8
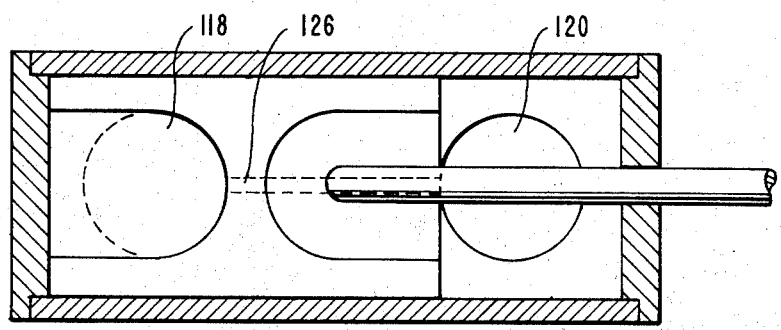
FIG.—9
INVENTOR.
GARY W TEED
BY
*Lyon+Lyon*
ATTORNEYS

BACK-SUCTION DIVERTER VALVE

The present application is a Continuation-in-part of original application Ser. No. 191,033, filed Oct. 20, 1971 and which is now abandoned.

BACKGROUND OF THE INVENTION

There are many instances of fluid handling systems in which it is desired for certain reasons to obtain a rapid shut-off of fluid flow. In some of these instances it may be undesirable or inconvenient to station a shut-off valve at the exact point at which flow is to be restricted and so frequently it is necessary to station a shut-off valve upstream of the outlet. A typical instance of this situation, although many come to mind, is in the fluid handling system employed on crop dusting airplanes. Here, when the aircraft reaches the end of a row, it is desired that fluid flow be terminated abruptly so that overspray is minimized. It is difficult to station shut-off valves at the fluid nozzles inasmuch as there are a large number of them and they are stationed all along the lower portion of the aircraft wing. It would require a large number of individual valves to be actuated simultaneously in order to properly control fluid flow. The alternative has been to station the shut-off valve upstream of the nozzles in the common feeder line but this does not permit the accomplishment of abrupt shut-off inasmuch as fluid will remain in the line downstream of the valve and will continue to result in residual flow from the nozzles.

SUMMARY OF THE INVENTION

It is a principal object of the present invention to provide a shut-off valve which may be installed in a fluid conduit system upstream of the outlet thereof but which will provide an abrupt shut-off at the outlet.

The present invention accomplishes the foregoing object by providing in the housing of the valve a movable valve element which diverts flow from the inlet port to another outlet port, or what shall be referred to here for convenience as a bypass port, so that flow through the valve continues whereby the bypass port may be coupled to a conduit which returns fluid either to a holding tank or to the main supply tank. In one embodiment the valve body includes a backsuction passage which couples the bypass port to the outlet port. A venturi-like restriction is provided by the configuration of the valve element when it is moved into the area of the bypass port near the back-suction passage creating a negative pressure in that passage and therefore in the outlet port so that fluid in the outlet line is conducted into the bypass line as long as fluid flows through the valve. In another embodiment of the invention, a space is provided between the bottom of the valve element and the base of the valve body, providing the aforementioned back-suction passage. In the primary flow position, the space beneath the valve element equalizes pressure on both sides of the element so that the element is free to move under high pressure condition. In addition, the element is provided with a spring supported bearing plate to give good sealing capability under highly abrasive conditions. Further objects and advantages of the present invention will become readily apparent upon reading the ensuing detailed description in conjunction with the accompanying drawings.

DESCRIPTION OF THE DRAWINGS

FIGS. 7, 8 and 9 show a second embodiment of the present invention, FIG. 7 being a perspective view of a modified form of the valve element and FIGS. 8 and 9 being a sectional side elevation and a sectional plan view respectively of the second embodiment.

FIGS. 10 and 11 being a sectional side elevation with the element shown in each position, FIG. 12 being a perspective view of an improved form of the valve element.

DESCRIPTION OF THE FIRST EMBODIMENT

Figure 3:
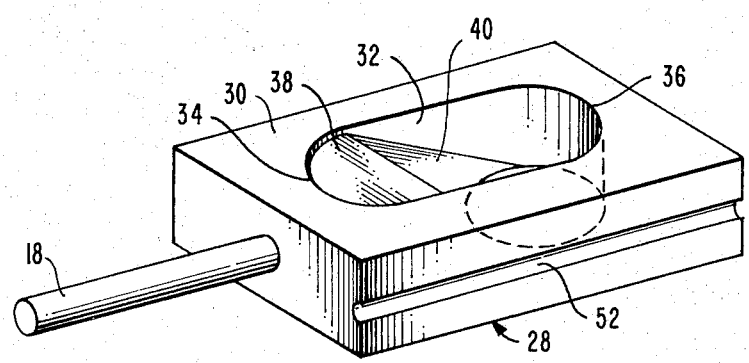
FIG. 3 is a perspective view of the embodiment of the moveable valve element shown in FIG. 1.
Figure 2:
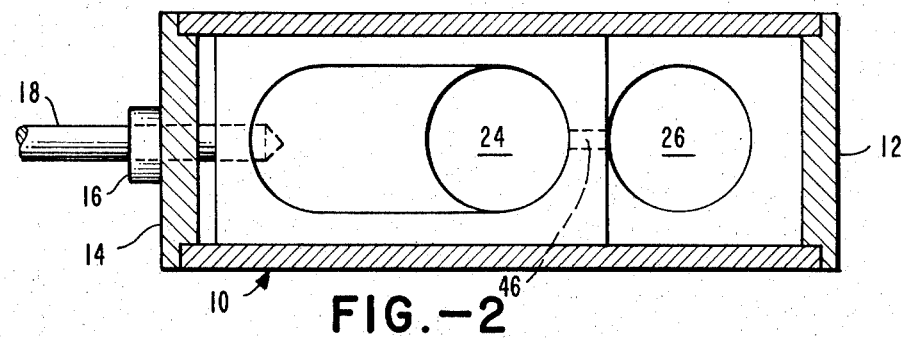
FIG. 2 is a cross sectional plan view of the valve shown in FIG. 1.

The valve consists of a valve housing generally designated 10, which can be an extruded rectangular tube, having a base 11 and a top portion 13. End caps 12 and 14 close each end of the housing 10 and end cap 14 includes a packing ring 16 adapted to receive actuating rod 18. The end caps 12 and 14 may be affixed to the housing 10 by overcenter clamps 20 or by any other suitable means.

On one side of housing 10 is an inlet port 22. On the opposite side there is an outlet port 24, preferably axially aligned with the inlet port 22, and also a bypass port 26. Inside the valve housing is the valve element 28 having a generally rectangular outer configuration so as to conform closely with the interior dimension of the housing. Actuating rod 18 is affixed to valve element 28. The top 30 of element 28 has an oval opening 32 therein with inner semicircular surfaces 34 and 36 and an end wall 37. The distance between surfaces 34 and 36 corresponds to the distance between the outermost extremities of outlet port 24 and bypass port 26 and the diameter of these semicircular surfaces conforms generally to the diameter of the outlet and bypass ports. Inside the oval opening 32 the body 38 of the valve element has a ramp portion 40 which extends downwardly from the top towards the bottom thereof and has an enlarged toe portion 42 as may be seen in FIG. 1. Inside the housing 10 between valve element 28 and the base 11 there is a thin sealing element 44 having apertures therein aligned with outlet port 24 and bypass port 26. In addition to those apertures, a channel 46 is formed in element 44 connecting ports 24 and 26 together. In the upper portion of the housing 10 between the top 30 of element 28 and the top plate 13 of the housing is a floating sealing plate 48 and a number of springs 50 which bias the plate 48 downwardly in sealing relationship to the valve element 28. A relief groove 52 is provided longitudinally along each side of element 28 to prevent hydrostatic lock of the element inside the housing.

Figure 1:
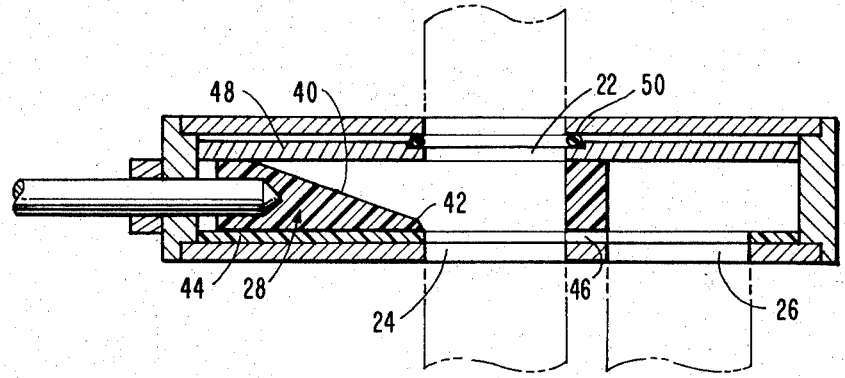
FIG. 1 is a cross sectional side elevation of a first embodiment of the valve.
Figure 4:
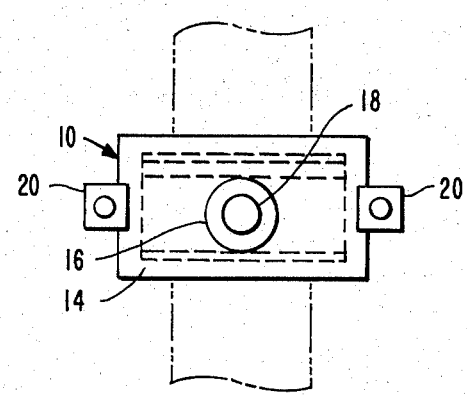
FIG. 4 is an end elevation of the valve shown in FIG. 1.

In the condition shown in FIG. 1, wherein conduits (shown in phantom lines) are suitably attached to the valve providing an inlet conduit to port 22 and outlet conduits to ports 24 and 26, the positioning of the valve element 28 with the actuating rod withdrawn provides for direct fluid flow through the valve with no restriction or change in direction of the flow, flow to the bypass port 26 being shut off by end wall 37.

Figure 5:
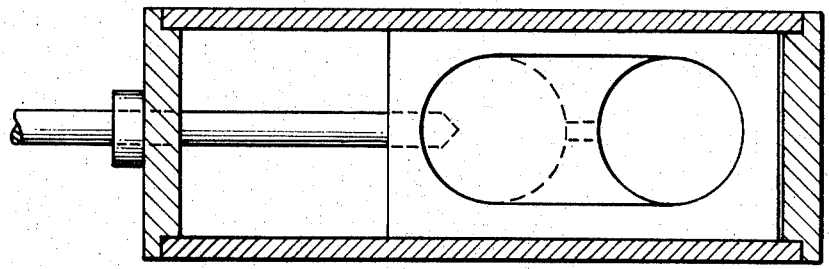
FIG. 5 is a sectional plan view of the first embodiment showing the valve element in the diverting position.
Figure 6:
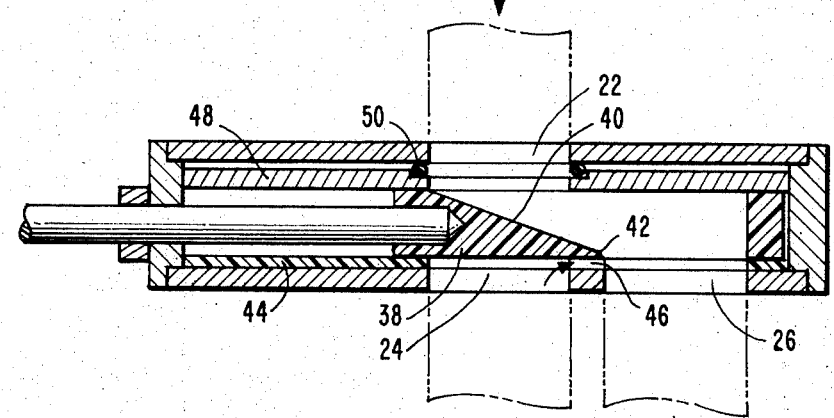
FIG. 6 is a cross sectional side elevation of FIG. 5.

In FIGS. 5 and 6, the actuating rod has been pushed inwardly to move the valve element 28 into the flow diverting position. In this position, the body portion 38 has closed off the outlet port 24 and the ramp surface 40 diverts flow from the inlet 22 to the bypass port 26. As fluid goes down the ramp 40 and passes over the toe 42 which restricts the flow, a negative pressure is created in passage 46 which therefore extracts any remaining fluid in the outlet port 24 and any conduit connected thereto. The vacuum created in passage 46 will be strong enough, assuming a continuous flow rate through the valve, to provide a quick and positive shut-off action and to neutralize any residual flow in the outlet conduit. The ramp 40 receives the direct flow coming through the inlet port 22 which thereby exerts a downward force on the valve element in turn forcing that into a tightly sealing relationship with the sealing member 44. The interior seal of the valve is further enhanced by the spring 50 which exerts a downward pressure on the floating sealing plate 48. As the valve parts are worn, the seal will be maintained since the sealing plate 48 is free to move and thus will stay in a sealing relationship. The relief groove 52 will prevent hydrostatic lock of the valve element by allowing the passage of fluid from one end of the valve to the other when the valve element is moved.

The toe portion 42 adds a restriction to the bypass passage to accomplish a venturi-like action. The advantage to inserting the restriction by means of the valve element, rather than having a venturi throat in the bypass port or downstream of the port is that the back-suction will be stopped quickly as soon as the valve element is moved even slightly to the left. Thus, partial opening of flow to the bypass port will not interfere with desired flow to the outlet port.

In crop dusting applications, the fluids conducted are rather granular and are expected to score the moving parts of the valve. Scoring of the underside of the tapered portion 40 of the valve element will create some additional back-suction passages which will enhance the function of the valve. Thus, the valve becomes more efficient upon continued use rather than the contrary.

DESCRIPTION OF THE SECOND EMBODIMENT

Turning now to FIGS. 7, 8 and 9, there is shown an alternative embodiment of the present invention the modification being solely in that instead of a single ramp in the valve element, the element is provided with dual ramps. The valve element is shown in FIG. 7 generally indicated by the numeral 100. Element 100 is symmetrically constructed having a ramp 102 on one side and another ramp 104 on the other side. Again, the element is provided with relief grooves 106 in the side. As may be seen in FIG. 8, the housing 100 is provided with end caps 112 and 113, end cap 113 having an actuating rod guide and sealing ring 114. The housing has again a single inlet port 116 and in this case has two outlet ports 118 and 120. The valve element 100 is shown mounted within the housing with an actuating rod 122 affixed thereto. Between the valve element 100 and the bottom 111 of the housing 110 there is situated a sealing gasket 124 provided with a back-suction passage 126. This embodiment of the valve is also provided with a floating sealing plate 128 which is urged downwardly against the valve element 100 by springs 130. In either the fully extended or fully withdrawn position of the actuating rod 122 wherein at least one of the outlet ports is fully covered, it will be apparent that the flow of fluid diverted by either surface 102 or 104 will create a back-suction in the passage 126 which would tend to evacuate fluid from the other outlet port. In this manner, this embodiment of the invention provides another valve capable of quick and positive shut-off action and also being capable of neutralizing any residual leakage.

DESCRIPTION OF THE THIRD EMBODIMENT

Figure 10:
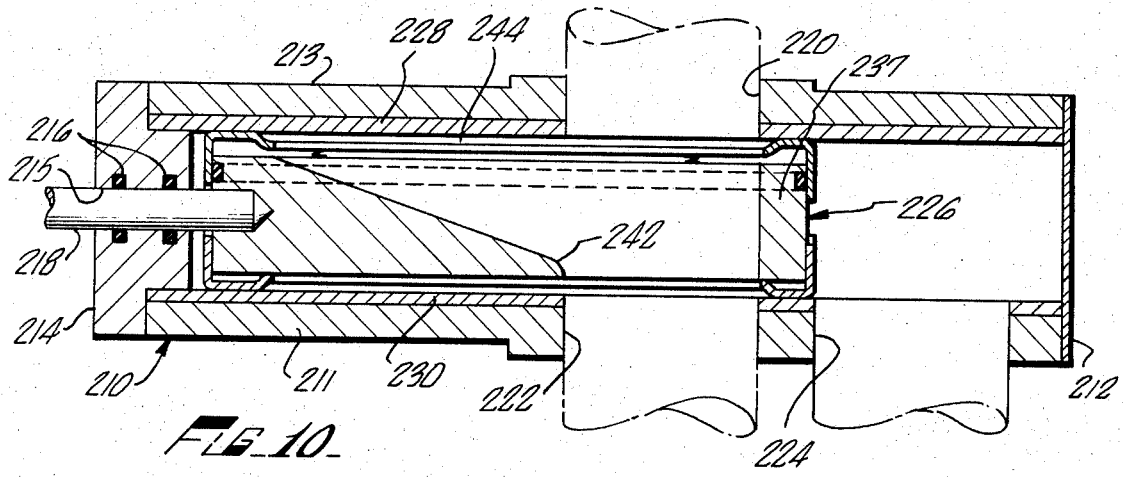
FIGS. 10, 11 and 12 show a third embodiment of the present invention.
Figure 11:
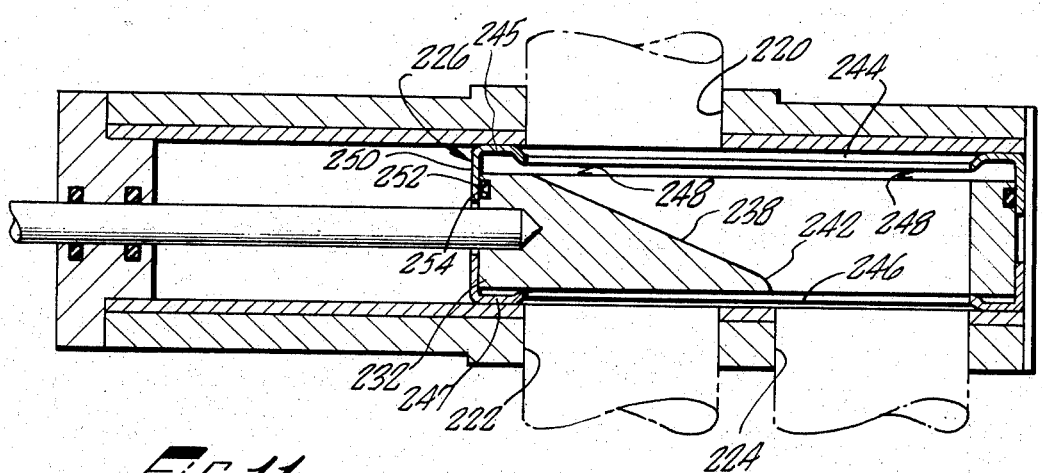
Figure 12:
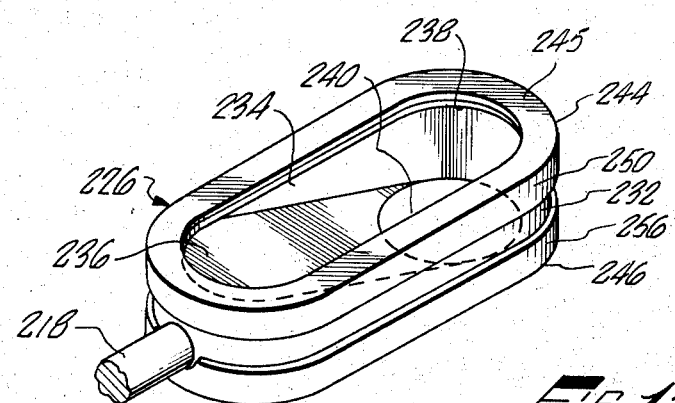

Another somewhat improved version of the diverter valve is shown in FIGS. 10, 11 and 12. The principal variation in this embodiment is a change in the relative location of the back-suction channel. The channel is here formed by raising the bottom of the valve element above the base plate of the valve housing, eliminating the need for forming the channel in the base of the housing. The advantages of this expedient will be discussed later herein.

The valve housing 210 comprises a top plate 213 and a base plate 211, with end plates 212 and 214. End plate 214 is provided with an aperture 215 and suitable sealing rings 216 adapted to accommodate actuating rod 218. Top plate 213 has an inlet port 220 as before, and base plate 211 has primary outlet port 222 and bypass port 224. Outlet port 222 is preferably axially aligned with inlet port 220. Actuating rod 218 is affixed to movable valve element 226 and top plate 213 is an upper sealing plate 228. Similarly, a second sealing plate 230 is situated against the base plate 211.

The valve element 226 (FIG. 12) comprised a body portion 232 having a generally oval configuration with curved ends. An oval opening 234 is formed in portion 232 having semicircular surfaces 234 and 236 and an end wall 237. As before, the distance between surfaces 234 and 236 corresponds to the distance between the outermost extremities of outlet port 222 and bypass port 224 and the diameters of their surfaces conform generally to that of said ports. The wedge shaped ramp portion 238 extends downwardly away from surface 234 towards surface 236 and at the bottom of the body 232 has a circular aperture 240. The ramp portion 238 has an enlarged toe portion 242 as can best be seen in FIGS. 10 and 11.

The body portion 232 of the valve element may be constructed of plastic or mild steel as it need not be abrasion resistant. Mounted upon the top and bottom of body 232 are a pair of bearing plates 244 and 246, providing upper and lower flanges 245 and 247 respectively which bear against sealing plates 228 and 230. The lower bearing plate 246 may be securely affixed to the body 232. Upper plate 244 is movably attached to the body, supported by a plurality of small springs 248. In this manner, a good seal is provided between the valve element and the valve housing 210 under the influence of the springs. The bearing plates 244, 246 may be constructed of hard steel resistant to the abrasive effects of the materials usually handled in crop dusting situations, as previously mentioned.

Upper plate 244 has a depending flange 250 extending around a periphery of the valve element body 232. To prevent leakage around the valve element at this point, the element body has an "O" ring 252 situated in a peripheral groove 254, the "O" ring sealingly engaging the flange 250 of plate 244. Lower plate 246 similarly has a flange 256 extending around the outer periphery of the element body. The flanges 250 and 256 are spaced apart forming a longitudinal groove 258 along each side of the valve element similar to groove 52 of FIG. 1.

The lower flange 247 spaces the bottom of the element body away from sealing plate 230 providing a back-suction passage when the valve element 226 is in the position shown in FIG. 11. In this position, the back suction provided when fluid continues to flow through ports 220 and 224 removes residual fluid from port 222 and from any conduit attached thereto. When the valve element is in the primary flow position (FIG. 10), a fluid pressure reaches the underside of the ramp portion 238 equalizing pressure exerted on the ramp surface by incoming fluid so taht the valve element is not hydrostatically stuck in the open position, and can be easily moved to the bypass position.

While several embodiments of the present invention have been shown and described it will be obvious to persons skilled in the art that changes and modifications might be made therein without departing from this invention in its broader aspects and it is the aim hereof to include all such changes and modifications as fall within the scope and spirit of this invention.

I claim:

1. A diverter valve comprising a housing having an inlet port and a pair of laterally spaced outlet ports, means providing a lateral passage communicating between said outlet ports, a valve element movably mounted within said housing between first and second selective positions whereby said inlet port is coupled to only one or the other of said outlet ports, and means for partially restricting fluid flow in at least one of said outlet ports in the vicinity of said lateral passage to create negative pressure in said passage.

2. A diverter valve of the type set forth in claim 1 wherein said valve element comprises a body portion having at least one ramp surface, said ramp surface being so disposed when said element is positioned in one of said two selective positions to communicate said inlet port with only one of said outlet ports.

3. A diverter valve of the type set forth in claim 2 wherein said means for partially restricting fluid flow comprises an elarged toe portion on said ramp surface of said valve element, said lateral passage having an orifice adjacent each of said outlet ports, said enlarged toe portion being positioned adjacent an orifice of said passage when said valve element is in at least one of said two selective positions.

4. A diverter valve of the type described in claim 1 wherein said valve element comprises a body portion having a ramp surface and a straight-through passage, said valve element when in a first position aligning said straight-through passage with said inlet port and one of said outlet ports, said valve element when in said second position interposing said body portion over the first said outlet port, said ramp surface operative to couple said inlet port to said second outlet port.

5. A diverter valve of the type set forth in claim 4 wherein said means for restricitng fluid flow comprises an enlarged toe portion on said ramp member, said lateral passage having an orifice adjacent each of said outlet ports, said enlarged toe portion being positioned adjacent the orifice located in said second outlet port when said valve element is in said second position.

6. A diverter valve of the type set forth in claim 1 wherein said valve element comprises a body portion having two ramp surfaces, said ramp surfaces being so disposed when said element is positioned in either one of said two selective positions to communicate said inlet port with one of said outlet ports, said body portion being further disposed as to close the other of said outlet ports.

7. The diverter valve set forth in claim 6 wherein said means for restricing fluid flow comprises an enlarged toe portion on each ramp surface, said lateral passage having an orifice adjacent each of said outlet ports, said toe portion being positioned adjacent one or the other of said orifices when said valve element is in one or the other of said positions.

8. A diverter valve comprising a housing having an inlet port, an outlet port and a bypass port; a movable valve element slidably mounted in said housing, said valve element having first and second positions, said valve element in said first position communicating said inlet and outlet ports, said valve element in said second position communicating said inlet and bypass ports, a back-suction passage communicating said outlet port with said bypass port, and means for partially restricting fluid flow in said bypass port to supply negative pressure in said back-suction passage.

9. A diverter valve of the type set forth in claim 8 wherein said back-suction passage comprises a channel formed in said housing between said outlet port and said bypass port.

10. A diverter valve of the type set forth in claim 8 wherein said valve element includes spacer means affixed to the lower peripheral edges of said valve body to space said body portion away from said housing to thereby form said back-suction passage.

11. A diverter valve of the type set forth in claim 8 wherein:
said housing comprises top and base portions, upper and lower sealing members disposed in said housing adjacent said top and base portions respectively, said sealing members having apertures therein registering with the respective inlet, outlet and bypass ports;
said valve element comprising a body portion having a ramp surface, upper and lower bearing means mounted upon said valve body, spring means mounted between said upper bearing means and said body portion, said lower bearing means including a flange situated between the lower surface of said body portion and said lower sealing member, said flange operative to sapce said valve body away from said sealing member thereby providing said back-suction passage when said valve element is in said second position.

12. A diverter valve of the type set forth in claim 8 wherein said housing comprises top and base portions, upper and lower sealing members disposed in said housing intermediate said valve element and said top and base portions respectively, spring means disposed between said top portion of said housing and said upper sealing member resiliently urging said member against the upper surface of said valve element.

13. A diverter valve of the type set forth in claim 12 wherein said back-suction passage comprises a channel formed in said lower sealing member between said outlet port and said bypass port.

* * * * *